United States Patent [19]

Deggau et al.

[11] Patent Number: 5,440,796
[45] Date of Patent: Aug. 15, 1995

[54] METHOD FOR MANUFACTURING A BRAKE SHOE

[75] Inventors: Wolf-Dieter Deggau, Ahlen; Dieter Kirschdorf, Im Paesken 26, D-4270 Dorsten, both of Germany

[73] Assignee: Dieter Kirschdorf, Germany

[21] Appl. No.: 45,655

[22] Filed: Apr. 9, 1993

[30] Foreign Application Priority Data

Oct. 30, 1992 [DE] Germany .................. 42 36 636.4

[51] Int. Cl.6 .................................... B23P 15/18
[52] U.S. Cl. ............................ 29/412; 29/892.2; 29/894.325; 72/110; 188/250 H; 188/250 B
[58] Field of Search .......... 29/412, 458, 892.2, 29/894.324, 894.325; 72/71, 110; 188/250 B, 250 E, 250 H

[56] References Cited

U.S. PATENT DOCUMENTS

| 1,924,590 | 8/1933 | Babel | 29/412 X |
| 1,924,622 | 8/1933 | Norton | 188/250 E X |
| 2,072,412 | 3/1937 | Tarbox | 188/250 E X |
| 2,136,899 | 11/1938 | Weaver | 29/412 X |
| 2,170,617 | 8/1939 | Hamill | 29/894.324 |
| 3,700,382 | 10/1972 | Pacak | 29/892.2 |
| 4,388,817 | 6/1983 | Victor | 29/894.324 X |

FOREIGN PATENT DOCUMENTS

| 63-63544 | 3/1988 | Japan | 29/892.2 |
| 63-137532 | 6/1988 | Japan | 29/892.2 |
| 1177297 | 1/1970 | United Kingdom | 188/250 H |
| 2025274 | 10/1978 | United Kingdom | |
| 2200060 | 7/1988 | United Kingdom | |

Primary Examiner—S. Thomas Hughes
Attorney, Agent, or Firm—Hill, Steadman & Simpson

[57] ABSTRACT

The invention is directed to a method for manufacturing a brake shoe particularly for drum brakes of motor vehicles, having a carrier of the brake lining whose outside surface has the shape of a circular cylindrical section, and having an arcuate or sickle-shaped web arranged radially inwardly of the carrier of the brake lining and by which the actuation forces of the brake are transmitted onto the carrier of the brake lining. The new manufacturing method provides that a ring having a cylindrical outside surface and a T-shaped cross section is shaped from a blank by buckling and subsequent flattening or by cleaving and subsequent flattening. The ring is divided into two or more ring segments each of which forms a brake shoe.

17 Claims, 3 Drawing Sheets

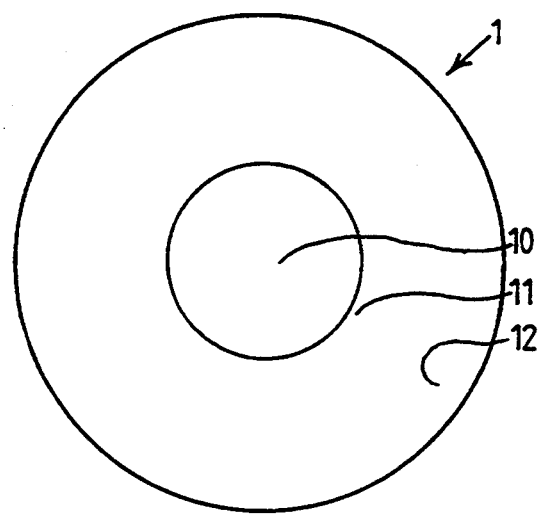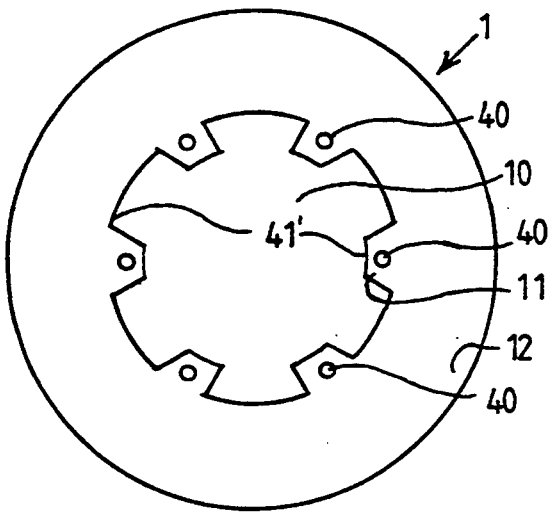
Fig. 4    Fig. 5
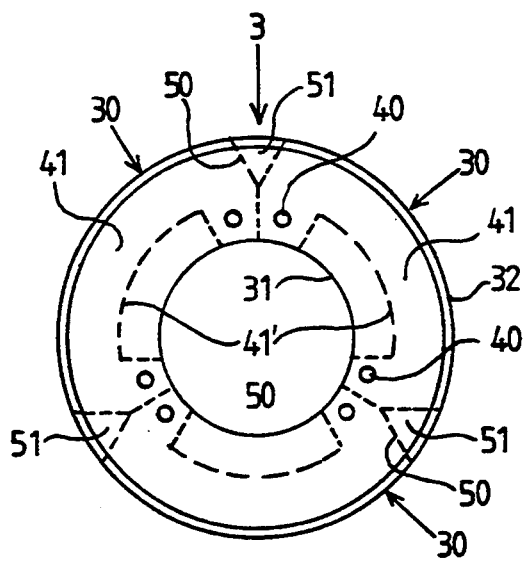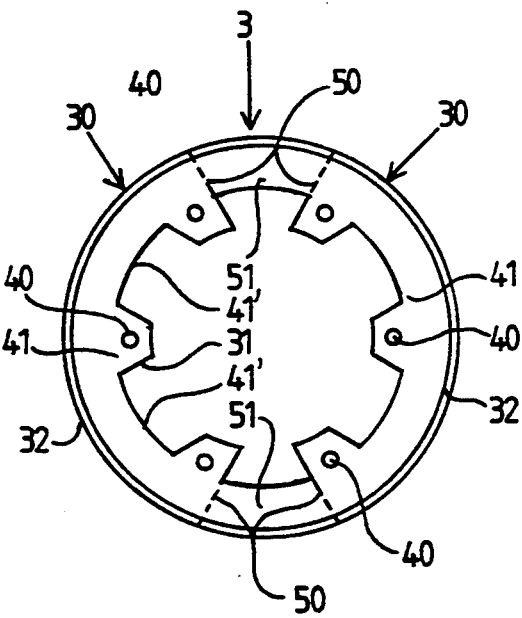
Fig. 6    Fig. 7 ed 5,440,796

METHOD FOR MANUFACTURING A BRAKE SHOE

BACKGROUND OF THE INVENTION

The invention is directed to a method for manufacturing a brake shoe for drum brakes of motor vehicles.

Various methods for manufacturing a brake shoe are known. In a first, known method, a sheet metal member pre-shaped in the form of a circular arc is welded to an approximately sickle-shaped sheet metal web. This method has the disadvantage of requiring that two discrete parts must be positioned relative to one another and must then be welded. This, first, requiring relatively great labor input and, second, leading to the fact that a high dimensional precision is difficult to achieve. Moreover, a weld represents a possible weak point of the brake shoe that can lead to malfunctions during operation of the brake under unfavorable conditions.

Another known method proposes that two pre-shaped sheet metal members having a L-shaped cross section and the form of a circular arc be arranged back-to-back and be joined to one another by welding or riveting. In this method, too, a relatively high labor input is required and tight dimensional tolerances cannot be observed. Moreover, a brake shoe manufactured in this way is relatively heavy since a relatively great quantity of sheet metal material is utilized, particularly in the region of the rib which, of course, is double-layer.

A third known method is the manufacture of brake shoes of cast iron or light metal in a casting process, whereby the manufacturing cost, however, is extremely high as a consequence of the required casting molds. What is thereby also disadvantageous is that cast brake shoes are subject to a higher risk of breakage than brake shoes composed of sheet metal.

It would be an advance in the art if there were provided a method for manufacturing a brake shoe of the type described above in which a stable and reliable and, at the same time, lightweight brake shoe could be manufactured with reasonable manufacturing cost.

SUMMARY OF THE INVENTION

The present invention provides a method of manufacturing a stable, reliable and lightweight brake shoe with reduced manufacturing costs in terms of assembly time and material. This method is useful for manufacturing a brake shoe used for drum brakes of motor vehicles which have a carrier of the brake lining whose outside surface has the shape of a circular cylindrical segment and which have an arcuate or sickle-shaped web arranged radially inwardly of the carrier of the brake lining by which the actuation forces of the brake are transmitted onto the carrier of the brake lining. The method provides that a ring, having a cylindrical outside surface and a T-shaped cross section, is shaped from a blank by buckling and subsequent flattening or by cleaving and subsequent flattening. The ring is then divided into two or more ring segments, each of which forms a brake shoe.

The present invention advantageously enables the manufacture of a one-piece brake shoe of sheet metal, as a result whereof the brake shoe, first, has extremely high stability and, second, has low weight. The brake shoes manufactured in this way also have an extremely exact form, particularly with respect to the curvature of their outside surface that accepts the brake lining, this guaranteeing an improved dimensional matching and, thus, an improved interaction between brake shoe with brake lining on the one hand and the appertaining brake drum on the other hand. Both types of shaping lead to a ring having a T-shaped cross section, whereby the T cross beam points toward the outside and forms a cylindrical outside surface of the ring. The structure of the material forming the ring is influenced such in this region by the reshaping that an especially high strength of the ring derives in the reshaped part.

In the simplest case, the sheet metal blank utilized in the method can be a simple, flat circular disc.

An alternative embodiment of the method provides that the radially inner region of the blank is provided with the required passages and/or is lent the desired contour of the webs by boring and/or milling and/or punching and/or cutting before the shaping of the ring. In this embodiment of the method, thus, some of the processing steps that are required for the shaping of the web of the brake shoe are placed preceding the shaping of the ring, since the blank in this case is still a flat part that can be processed in a comparatively simple way by these mechanical processing methods.

Another embodiment of the method proposes that the ring is provided with the required passages and/or is lent the desired contour of the webs by boring and/or milling and/or cutting preceding the shaping of the ring and before the division of the ring. A closed ring that is still a one-piece component part from which two or more brake shoes can then be manufactured is still present at this point in the method. This one-piece component part can be simultaneously processed with these processing methods for two or more brake shoes.

After the division of the ring into the ring segments, these ring segments, in the scope of the method, can also be provided with the required passages and/or can be lent the desired contour of the webs by boring and/or milling and/or punching and/or cutting. In this embodiment of the method, thus, the individual ring segments from each of which a respective, individual brake shoe is manufactured are processed, this being potentially advantageous due to their smaller size and the lower work forces or smaller tools required as a result thereof.

There is also the possibility to divide the processing steps required for the webs of the brake shoes and to implement them at different times during the process.

The shaping of the ring from the blank is preferably carried out on a chasing machine, since such machines and the reshaping procedures that can be implemented on them are known and proven and are suitable for the method of the invention.

For avoiding weak points and for further enhancing the mechanical stability of the brake shoes manufactured with the method, it is provided that a rounded-out transition between the inner, radial part and the outer, axial part of the ring is produced when shaping the ring. As a result thereof, the brake shoes are lent a correspondingly rounded-out transition from the web to the outwardly disposed part that forms the carrier for the brake lining; this enabling higher stability of the brake shoe given less utilization of material and, thus, a lower weight.

For further optimization of the relationship of stability to weight of the brake shoe, it is provided that the outer, axial part of the ring is reshaped in the shaping of the ring into a member having identical bending stresses with a thickness of material that decreases toward its free ends. As a result of such an optimized distribution of the thickness of the material, a maximum stability is achieved given minimum weight of the brake shoe manufactured according to the method.

When shaping the ring, additionally, at least one projecting rib proceeding in circumferential direction can be radially applied to the inside and/or outside at the outer, axial part of the ring. This rib or, respectively, these ribs can have various functions; a first function is a mechanical stabilization; a second function is the modification of the vibratory behavior of the brake shoe, as a result whereof vibrations arising when braking that are expressed as an unpleasant squeaking, can be reduced or prevented. The application of a rib or a pair of ribs on the radially outside of the ring, particularly at the lateral edges thereof, leads to a brake shoe that comprises lateral seating edges for a brake lining to be applied thereto, these guaranteeing the exact and proper positioning thereof.

Another development of the invention proposes that a plurality of ribs proceeding in axial direction are radially applied at the inside and/or outside at the outer, axial part of the ring when shaping the ring. These ribs also serve the purpose of mechanical stabilization and of influencing the vibration of the brake shoe.

Finally, the method also proposes that a steel or aluminum blank be employed as the sheet metal blank.

The brake lining for the brake shoe is preferably glued on, since this type of joining can be very quickly implemented and the introduction of bores or holes in the brake shoe and in the brake lining, as well as the riveting of these two parts to one another can thereby be foregone.

The method of the invention shall be set forth below with reference to a drawing. Shown in the figures of the drawing are:

BRIEF DESCRIPTION OF THE DRAWINGS

FIG. 4 illustrates a blank in a plan view in a first embodiment as raw material for the method;

FIG. 5 illustrates in plan view a blank in a second embodiment;

FIG. 6 illustrates in plan view a ring produced from the blank during the course of the method on the basis of reshaping, said ring having the contours of brake shoes, shown in a first embodiment;

FIG. 7 illustrates in plan view a ring shaped during the course of the method having the contours of brake shoes, shown in a second embodiment;

DETAILED DESCRIPTION OF THE PREFERRED EMBODIMENTS

Figure 1:
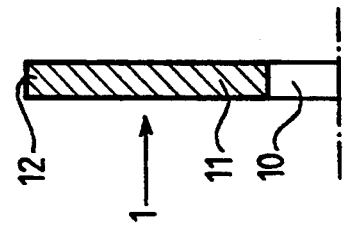
FIG. 1 illustrates a blank as raw material for the method, in a partial cross section.

As an example of the raw material of the method, FIG. 1 of the drawing shows a flat sheet metal blank 1 that has the shape of an annulus (only one half being illustrated). A clearance 10 is situated in the center of the blank 1, the radially inner region 11 following upon this clearance 10 toward the outside and the radially outer region 12 of the blank 1 following thereupon yet farther toward the outside. The sheet metal blank 1 is composed of steel or aluminum and has a constant thickness over its radius.

Figure 2A:
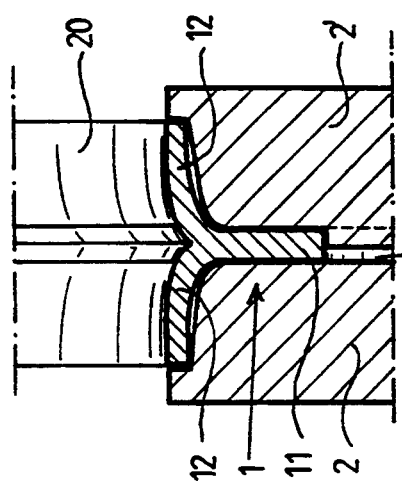
FIG. 2a illustrates the blank in cross section during a first reshaping step undertaken by splitting.
Figure 2B:
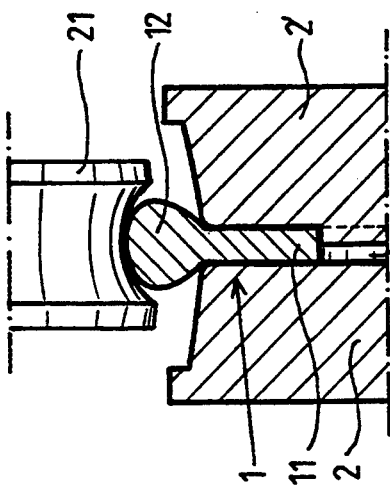
FIG. 2b illustrates the blank in cross section during an alternative first reshaping step by buckling.

For the implementation of a first reshaping step, the blank 1 is clamped between two parts 2, 2' of a rotationally driveable tool of a chasing machine, as shown in FIGS. 2a and 2b. The radially inner region 11 of the blank 1 is thereby firmly clamped; the central clearance 10 in the blank 1 serves the purpose of centering with respect to the tool parts 2, 2'. The tool parts 2, 2' are dynamically balanced in this case, whereby only the one half above the rotational axis indicated by a dot-dash line is shown in FIGS. 2a and 2b.

In the exemplary embodiment of the method according to FIG. 2a, the radially outer region 12 of the blank 1 placed in rotation is cleaved by a feedable cleaving roller 20 that is likewise rotatable. The outer region 12 is folded over toward the left and right until the outer ends of the cleaved, outer blank region 12 are seated against the outer circumference of the tool parts 2, 2'.

In a method step according to FIG. 2b to be employed as an alternative to the method step according to FIG. 2a, the clamped, rotating blank 1 has its radially outer region 12 reshaped into a shape having a droplet-like cross section with a feedable and rotatable buckling roller 21.

In a further method step following the method step according to FIG. 2a or 2b, the outer region of the blank is pressed flat to form an outer, annular part 32, whereby a feedable, cylindrical chasing roller 22 is employed for this purpose. A ring 3 having a T-shaped cross section and a cylindrical outside surface and a radially inner part 31 that lies between the tool parts 2, 2' of the chasing liner arises as a result of this method step. The transition from the inner part 31 to the outer part 32 is thereby rounded out in order to promote stability. Further, the thickness of the material of the outer part 32 is constantly diminished toward its free ends, this saving weight without losing stability. The ring 3 produced in this way is subjected to further processing after removal from the tool parts 2, 2', this to be set forth below.

FIG. 4 shows a plan view onto the blank 1 shown in partial cross section in FIG. 1, whereby the annular form becomes particularly clear here. The central clearance 10 lies in the center of the blank 1, followed toward the outside by the radially inner region 11 and the radially outer region 12 of the blank 1.

Figure 3:
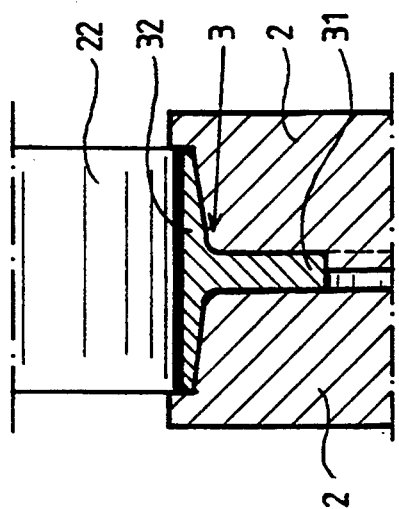
FIG. 3 illustrates the blank in cross section at the end of a second reshaping step of being pressed flat.

FIG. 5 shows another form of the blank 1 that can likewise be utilized as raw material for the reshaping by chasing according to FIGS. 2a, 2b and 3. The blank 1 is here likewise fashioned flat with a circular outer circumference; the inside circumference of the blank 1 here, however, is not circular but shaped with a contour 41' that already largely corresponds to the contour of two brake shoes, the webs thereof to be more precise, to be manufactured from this blank 1. In addition to the central clearance 10, further, a plurality of small clearances or bores 40 have already been applied in this blank 1, these being required for the later function of the brake shoe.

FIGS. 6 and 7 each show a plan view onto a ring 3 as present after the method step according to FIG. 3. As may be seen from both figures, the ring 3 is circular and has a radially inner part 31 as well as a radially outer part 32 having a cylindrical outside surface.

The ring 3 of FIG. 6 is produced from a blank according to FIG. 4, whereby the inner edge of the radially inner part 31 of the ring 3 is also circular. During the further course of the manufacturing method, this ring 3 is divided with methods known from metal processing along the parting lines 50 that are indicated by broken lines, being divided in this example into a total of three ring segments 30 from each of which a respective brake shoe then arises as a result of further processing. Only small waste pieces 51 arise between neighboring parting lines 50, this yielding a good utilization of material. During the course of further processing, clearances or bores 40 are then also produced in the inner part 31 of the ring 30, this then forming the webs 41 of the brake shoe. Moreover, the contour 41' of the webs 41 that is indicated here by broken lines is produced, for example, by punching. Following this, a brake shoe is then present onto which a brake lining can be applied.

FIG. 7 of the drawing shows an example of a ring 3 that is shaped from a blank 1 according to FIG. 5. The radially inner part 31 of the ring 3 already has the contour 41' of the web 41 of the brake shoes to be produced from the ring 3, whereby the ring 3 is divided into two ring segments 30 in this exemplary embodiment. The division of the ring 3 into the two ring segments 30 from each of which a respective brake shoe is manufactured ensues along parting lines 50 that are indicated by broken lines. The division, for example, can be undertaken by cutting, punching or combined processing methods that are known. Relatively small waste pieces 51 again arise between the two ring segments 30, these representing only a slight part of the material utilized overall. A plurality of small clearances or bores 40 that the brake shoe requires for its function are again provided here over the course of the webs 41.

In the example of the rings shown in FIG. 3, the radially outer, axially extending part 32 thereof is fashioned smooth at the outside as well as at the inside. Consequently, the brake shoes manufactured from such a ring 3 have a smooth outside and inside of the carrier for the brake lining. However, other designs of the brake shoes are also possible here, a few examples thereof being shown in FIGS. 8 through 10.

Figure 8:
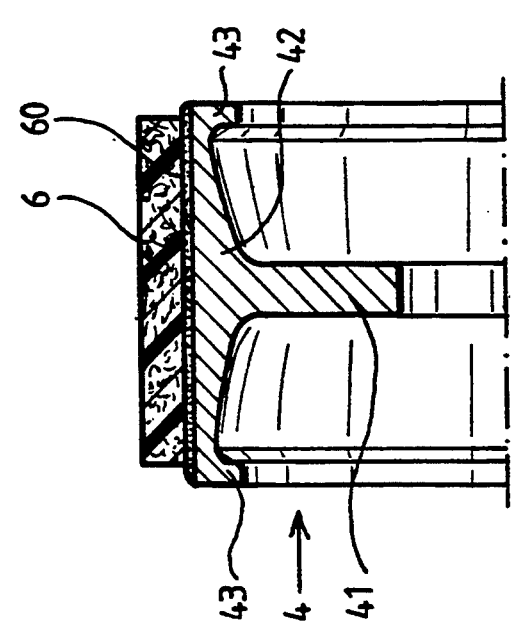
FIG. 8 illustrates in a partial cross section a first embodiment of a brake shoe manufactured according to the method.

FIG. 8 shows a partial cross section of a first exemplary embodiment of a brake shoe 4 which, like all brake shoes shown here, comprises a web 41 forming a radially inner part, as well as an axially outer part extending perpendicularly thereto that forms the carrier 42 of the brake lining. As a special feature, the brake shoe 4 of FIG. 8 has a radially inwardly projecting rib 43 at both axial ends of the carrier 42 of the brake lining. This rib 43 serves, first, the purpose of stabilizing the carrier 42 of the brake lining and, second, the purpose of influencing the vibratory behavior of the brake shoe 4, particularly for diminishing or avoiding squeaking noises when braking. A standard brake lining 6 is put in place here on the outer surface of the carrier 42 of the brake lining in a known way, such as with an adhesive layer 60.

Figure 9:
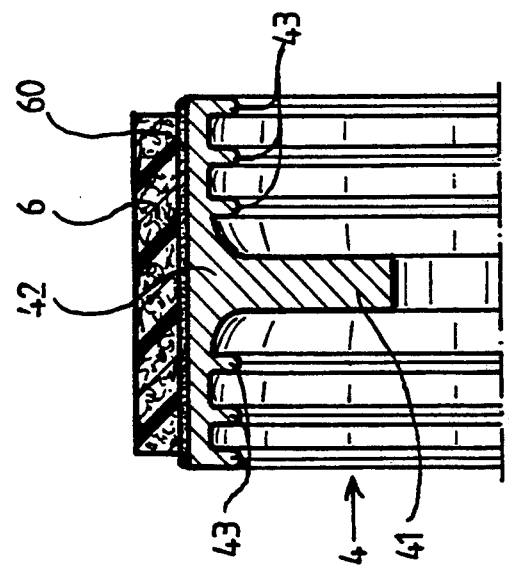
FIG. 9 illustrates in partial cross section a second embodiment of a brake shoe manufactured according to the method.

Presented in the same way as in FIG. 8, FIG. 9 shows another exemplary embodiment of a brake shoe 4 that likewise comprises a radially proceeding web 41, a carrier 42 of the brake lining proceeding perpendicularly thereto, as well as a brake lining 6 glued thereon with the adhesive layer 60. Differing from the exemplary embodiments set forth above with reference to FIG. 8, three radially inwardly projecting ribs 43 are provided here at the inside surface of the carrier 42 of the brake lining at both sides of the web 41. These ribs, in addition to satisfying their stabilizing and vibration-damping function, also satisfy the function of cooling ribs as a result of a significant enlargement of the inner surface area of the carrier 42 of the brake lining. As a result thereof, a better heat elimination from the brake lining 6 and from the brake shoe 4 is achieved given severe stressing.

Figure 10:
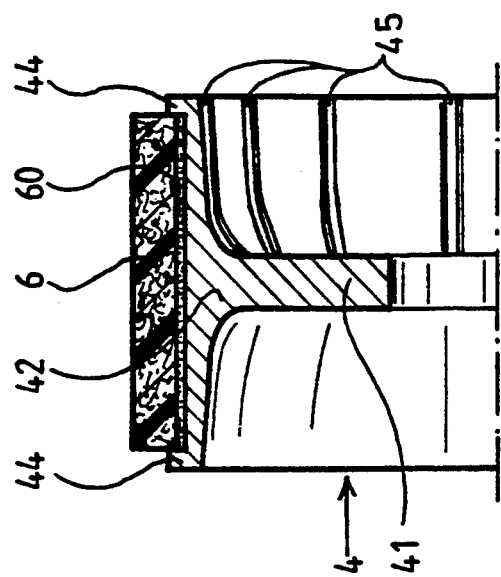
FIG. 10 illustrates in partial cross section a third embodiment of a brake shoe manufactured according to the method.

Likewise presented in the same way as in FIGS. 8 and 9, finally, FIG. 10 shows a brake shoe 4 wherein the carrier 42 of the brake lining has a radially outwardly projecting rib 44 at each axial on the surface facing toward the brake lining 6. These ribs 44 particularly serve the purpose of assuring an exact positioning of the brake lining 6 on the carrier 42 of the brake lining, whereby the height of these ribs 44 is small in comparison to the thickness of the brake lining. In addition to having the rib 44 proceeding in circumferential direction, the exemplary embodiment of the brake shoe 4 shown here also includes axially disposed ribs 45 extending radially inwardly at the inner side of the carrier 42 of the brake lining. These ribs 45, in particular, serve as stabilizing and vibration-damping elements of the brake shoe 4, whereby the ribs 44 also additionally exercise this function.

Differing from what is shown in FIGS. 8 through 10, combinations of ribs 43, 44, 45 can also be provided both at the radially outward side as well as at the radially inward side of the carrier 42 of the brake lining. The fashioning of the ribs 43, 44, 45 advantageously ensues while the ring 3 is being shaped, so that no special work steps are required for this purpose. The tool parts 2, 2' of the chasing machine as well as the chasing rollers 20, 21, 22 utilized must merely be correspondingly shaped and fashioned, in a multi-part fashion if necessary.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method for manufacturing a brake shoe comprising a carrier of a brake lining whose outside surface has the shape of a circular cylindrical segment, and comprising an arcuate web arranged radially inwardly of the carrier of the brake lining by which the actuation forces of the brake are transmitted onto the carrier of the brake lining, comprising the steps of:

shaping a ring having a cylindrical outside surface and a T-shaped cross section from a flat annular blank by deforming by first buckling a radial outer portion of said blank into a droplet-like cross section shape and subsequent flattening of said radial outer portion of said blank; and dividing the ring into at least two ring segments, each of which forms a brake shoe.

2. A method according to claim 1, and further comprising providing a radially inner region of said blank with required apertures before the shaping of said ring.

3. A method according to claim 1, and further comprising providing a radially inner region of said blank with a desired contour before the shaping of said ring.

4. A method according to claim 1, and further comprising providing a radially inner region of said blank with required apertures following the shaping and before the division of said ring.

5. A method according to claim 1, and further comprising providing a radially inner region of said blank with a desired contour following the shaping and before the division of said ring.

6. A method according to claim 1, and further comprising providing a radially inner region of said blank with required apertures following the division of said ring.

7. A method according to claim 1, and further comprising providing a radially inner region of said blank with a desired contour following the division of said ring.

8. A method according to claim 2, and further comprising providing said apertures by one or more of drilling, milling, punching and cutting.

9. A method according to claim 4, and further comprising providing said apertures by one or more of drilling, milling, punching and cutting.

10. A method according to claim 6, and further comprising providing said apertures by on or more of drilling, milling, punching and cutting.

11. A method according to claim 1, wherein said shaping of said ring is implemented on a chasing machine.

12. A method according to claim 1, and further comprising providing a rounded-out transition between an inner-radial part and an outer, axial part of said ring when shaping said ring.

13. A method according to claim 12, and further comprising reshaping said outer, axial part of said ring when shaping said ring into a member having identical bending stresses with a thickness of material that decreases towards its free ends.

14. A method according to claim 13, and further comprising forming at least one radially projecting circumferential rib when shaping said ring on said axial part of said ring.

15. A method according to claim 13, and further comprising forming at least one radially projecting axial rib when shaping said ring on said axial part of said ring.

16. A method according to claim 1, and further comprising employing said blank with a material from the group consisting of steel and aluminum.

17. A method for manufacturing a brake shoe having a circular cylindrical segment surface and an arcuate web extending radially inwardly of said surface and approximately perpendicular thereto comprising the steps of:

deforming by buckling a radially outer portion of an annular disk into a droplet-like cross section shape and then pressing said buckled portion to make a T-shaped cross section comprising a circular cylindrical surface and an annular web extending radially inwardly of said surface; and subsequently dividing said deformed disk into at least two segments, each of which forms a brake shoe.

* * * * *